(12) United States Patent
Bradley et al.

(10) Patent No.: US 6,375,243 B1
(45) Date of Patent: Apr. 23, 2002

(54) WHEEL ASSEMBLY FOR A ROLLER COASTER

(75) Inventors: Aidan J. Bradley; Kevin T. Parent, both of Santa Barbara, CA (US)

(73) Assignee: The Wheel Thing, Inc., Montrose, CA (US)

( * ) Notice: Subject to any disclaimer, the term of this patent is extended or adjusted under 35 U.S.C. 154(b) by 0 days.

(21) Appl. No.: 09/502,116

(22) Filed: Feb. 10, 2000

Related U.S. Application Data

(60) Provisional application No. 60/139,016, filed on Jun. 14, 1999.

(51) Int. Cl.[7] ................................................. B60B 9/00
(52) U.S. Cl. ................................. 295/1; 295/11; 152/47
(58) Field of Search ........................... 295/1, 7, 11, 21, 295/25, 26; 152/40, 47, 42, 48, 50; 301/6.3

(56) References Cited

U.S. PATENT DOCUMENTS

| | | | | |
|---|---|---|---|---|
| 589,022 A | | 8/1897 | Palmer et al. | |
| 623,883 A | * | 4/1899 | Cameron | 295/11 |
| 668,385 A | | 2/1901 | Morgan | |
| 1,374,428 A | | 4/1921 | Chadderdon | |
| 1,555,479 A | * | 9/1925 | Morand | 295/11 |
| 1,882,498 A | | 10/1932 | Jarvis | |
| 2,113,379 A | * | 4/1938 | Maas | 295/11 |
| 2,245,444 A | | 6/1941 | Ross | |
| 2,898,142 A | * | 8/1959 | Kordes | 295/11 |
| 3,101,214 A | * | 8/1963 | Talboys | 295/1 |
| 4,458,966 A | * | 7/1984 | Stensson et al. | 295/11 |
| 4,503,944 A | * | 3/1985 | Burckhardt et al. | 301/6.3 |
| 5,026,106 A | * | 6/1991 | Biermann | 295/1 |
| 5,183,306 A | * | 2/1993 | Emilsson | 295/11 |
| 5,579,818 A | | 12/1996 | Hoppenheit et al. | |
| 5,702,141 A | * | 12/1997 | Broucke et al. | 295/7 |

\* cited by examiner

*Primary Examiner*—S. Joseph Morano
*Assistant Examiner*—Long Bao Nguyen
(74) *Attorney, Agent, or Firm*—Gene W. Arant

(57) ABSTRACT

A tire assembly for a wheeled vehicle has a ring-shaped integrally formed outer tire member made of relatively hard and relatively rigid material, and a ring-shaped integrally formed inner tire member. The inner tire member is made of a resilient material that is essentially incompressible but rather easily deformable, so that the inner tire member may be deformed to position it inside the outer tire member with the outer surface of the inner tire member in interfitting relation to the inner surface of the outer tire member, and has protuberances and recesses formed in at least one of its circumferential surfaces to allow for both radial compression and lateral expansion of its material, thereby ensuring resilient support of the outer tire member.

12 Claims, 4 Drawing Sheets

WHEEL ASSEMBLY FOR A ROLLER COASTER

RELATED APPLICATION

This application claims the priority of U.S. Provisional Application No. 60/139,016 filed Jun. 14, 1999.

FIELD OF THE INVENTION

This invention relates to transportation, and particularly to the construction of wheels for wheeled vehicles.

1. Prior Art

The current technology for roller coaster load wheels employs a cast aluminum hub with a thin tire made from a sophisticated polyurethane. The tire is cast on and bonded to the hub. The wheel is mounted to the axle of the roller coaster vehicle through a bearing. A great deal of research and testing has been undertaken over the years to derive the optimal tire material in an attempt to balance the demanding requirements.

2. Background of the Invention

In certain applications there are extreme requirements placed upon the wheel assembly of a wheeled vehicle. This is particularly true in amusement parks where high-performance roller coasters today operate at speeds in excess of 80 miles per hour and experience in excess of 5 Gs of acceleration in the maneuvers. On a typical coaster, there as many as 100 wheels of various types. The wheels that carry the weight of the vehicle and its load are called "The Load Wheels." Other wheels are "Guide Wheels" or "Upstop Wheels."

There are several fundamental requirements on the Load Wheels: They must carry the load of the roller coaster and the occupants. This load can be as high as five times the weight of the vehicle and its occupants (in 5-g maneuvers) divided among the load wheels. This can be in excess of 5000 pounds of force per wheel.

They must be capable of carrying this load while the vehicle is traveling at high speeds. At 80 miles per hour, a 9-inch diameter wheel, a typical size, spins at approximately 3000 revolutions per minute.

They must have low rolling resistance. The dynamic maneuvers are only possible when the losses are minimized. The requirement for low rolling resistance drives the tire toward a harder material. Typical rolling resistance of a roller-coaster wheel is between 0.010 and 0.017 of the load supported.

They must provide a Smooth Ride. Most roller coasters have no compliant element between the track and the occupants except the tire on the wheels. It is very difficult to construct the very large welded track so that it is smooth enough to allow for little or no compliance in the vehicle. As a result, the tires must absorb the small imperfections of the track. Contrary to the rolling resistance requirement, the Smooth Ride requirement drives the tire toward a softer material.

They must provide minimum cyclic maintenance Costs. In particular, the amusement park operators require that the tires last as long as possible and would prefer it to be inexpensive to replace the tires when necessary. These are the basic requirements on the Load Wheels. The following section describes the current state of the art for these wheels.

The current technology for roller coaster load wheels has significant limitations, including the following:

Limited Operating Range

The best wheels with the best known tire materials using the current methods are not always capable of handling the range of operation desired by the roller coaster manufacturers and owners. The wheels, as much or more than any other element of the roller coaster system, have set the upper boundary for performance. While modern coasters are being designed to run faster and to have more dynamic maneuvers than ever before, the wheels in use today are falling short of the speed and load ranges demanded of them.

Failure Modes

The following are the failure modes of the current wheels under these dynamic conditions:

Internal Meltdown

The polyurethane tire is constantly being deformed as the wheel rolls down the track under load and at speed. The very localized point where the tire contacts the typical tubular track is compressed significantly. As the wheel rolls, that point re-expands, and the next point is compressed. This constant "kneading" of the material results in a process known as "hysteretic heating." Temperatures inside Load Wheels can exceed 250 degrees Fahrenheit. When temperature inside the tire reaches the melting point of the material, the internal urethane liquefies and is ejected out of the sides.

Bond Line Failure

As a result of the elevated stress cycles on the wheel, the bond between the tire and the hub may become weakened. At this point, the tire begins to move independently from the hub. The tire is eventually torn or driven off the hub. Until these problems are solved, roller coaster design is limited by the capabilities of the wheels.

Wear

The current technology roller coaster wheels wear out more frequently than the designers and customers would desire. This is true of both the highly dynamic coasters and the more mild ones as well. When the tires wear out, they need to be replaced. This results in installations that are unavailable for use and in significant maintenance costs. The principal modes for the tires wearing out are: material loss, chunking, and spalling of the polyurethane as a result of cyclic exposure to high loads and track imperfections as well as dirt and debris. While using a harder tire material can significantly reduce this problem, the result is an unacceptably rough ride. Wheel designers have constantly battled with the balance between the requirements for a Smooth Ride and acceptable wear. The best materials in use today on dynamic roller coasters have what many believe is insufficient wear characteristics.

Operating Costs

The problem of excessive wear is compounded by very high maintenance and repair costs. The process of "re-treading" a wheel is very expensive. First, the old material must be carefully removed; then the surface chemically treated to accept the new tire. Finally the new tire is cast onto the hub. The casting and set-up time can run as long as several weeks depending on the material. A significant portion of the ongoing operational cost of a roller coaster is in tire replacement.

SUMMARY OF THE INVENTION

According to the present invention a wheel assembly for a wheeled vehicle is provided with separate inner and outer tire members, the outer tire member being made of a relatively hard and rigid material while the inner tire member is made of a relatively softer and more resilient material.

According to the presently preferred form of the invention the outer circumferential surface of the inner tire member and the inner circumferential surface of the outer tire member have interfitting shapes such as to hold them in a fixed relative position, and the inner tire member is sufficiently resilient so that it may be temporarily deformed when fitting it into the outer tire member.

More specifically, a wheel assembly in accordance with the invention includes a generally ring-shaped integrally formed outer tire member having a laterally convex circumferential inner surface, and a generally ring-shaped integrally formed inner tire member that is of substantially uniform thickness throughout its lateral width and has a laterally concave outer surface. The outer tire member is made of relatively hard and relatively rigid material, and the inner tire member is made of resilient material, so that the inner tire member may be deformed in order to position it inside the outer tire member with the concave outer surface of the inner tire member in interfitting relation to the convex inner surface of the outer tire member.

Further according to the present invention, because of the substantially uniform thickness of the inner tire throughout its width, it has a laterally convex inner circumferential surface. A hub assembly is adapted to engage and support the laterally convex inner circumferential surface of the inner tire and to maintain a radially outward force on it, in order to maintain the assembled position of the inner and outer tire members without the use of a separate bonding material or special bonding action between them.

Other features and advantages of the invention will be apparent from the detailed disclosure which follows.

DRAWING SUMMARY

Figure 1:
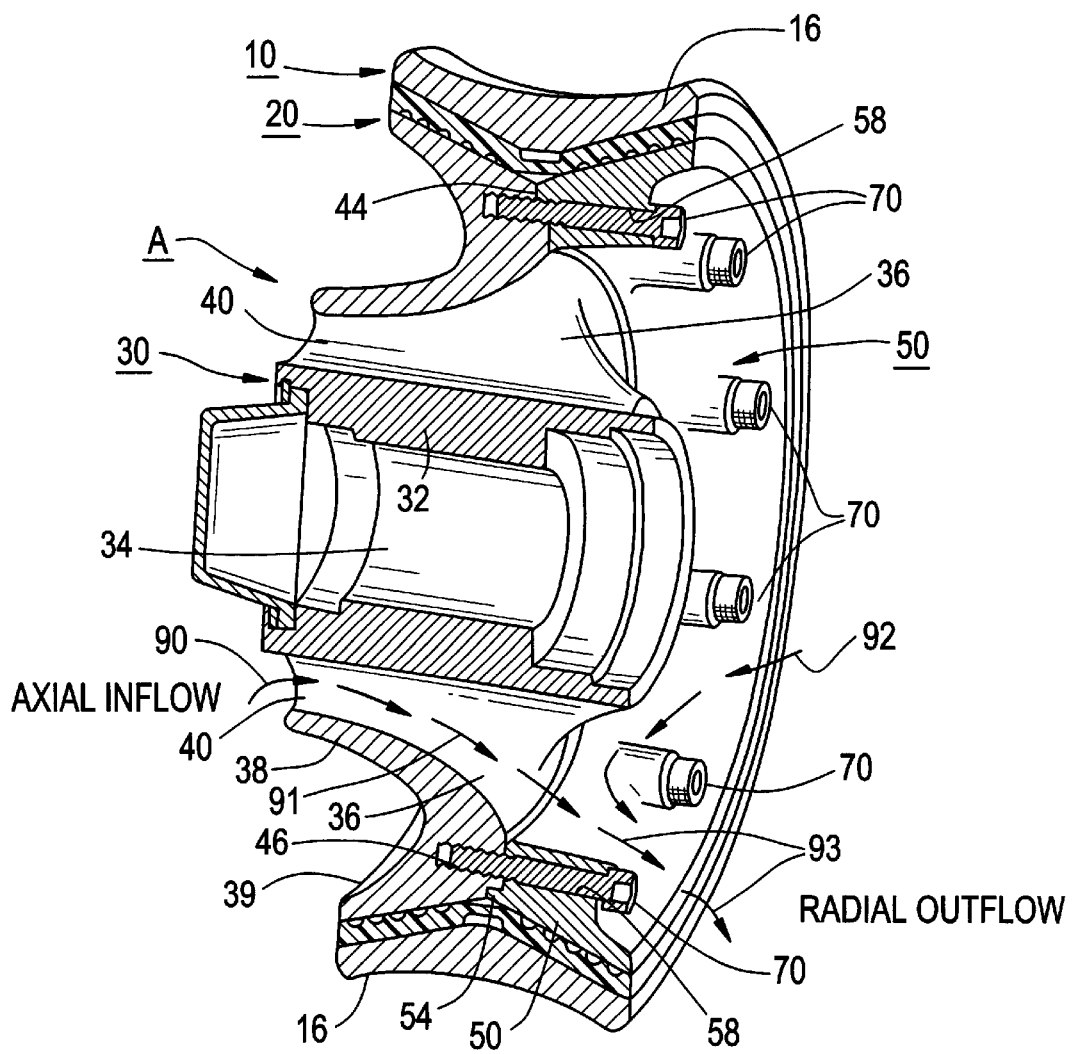
FIG. 1 is a cut-away perspective view of the presently preferred form of wheel assembly in accordance with the invention.

DESCRIPTION OF THE PREFERRED EMBODIMENT
(FIGS. 1–5)

Referring now to the drawings, a wheel assembly A in accordance with the invention is supported upon a pipe-shaped or tubular rail B. In general, wheel assembly A includes an outer tire member 10, an inner tire member 20, an outer or outboard hub member 30, an inner or inboard hub member 50, and bolts 70 to secure the hub members together.

Outer tire member 10 of generally ring-shaped configuration is integrally formed of relatively hard and rigid material. It has two flat peripheral surfaces 12 that are parallel to the plane of the tire member, a laterally convex inner circumferential surface 14, and a laterally concavely curved circumferential outer surface 16.

Inner tire member 20 is also of generally ring-shaped configuration and is integrally formed of relatively soft and resilient material. It has flat peripheral edge portions 22 that are parallel to the plane of the tire member, a laterally concave outer surface 24, and a circumferential inner surface 26 which is laterally concavely curved. There are also grooves 28 in the inner surface 26 which extend around the entire circumference of the inner tire member.

Figure 3:
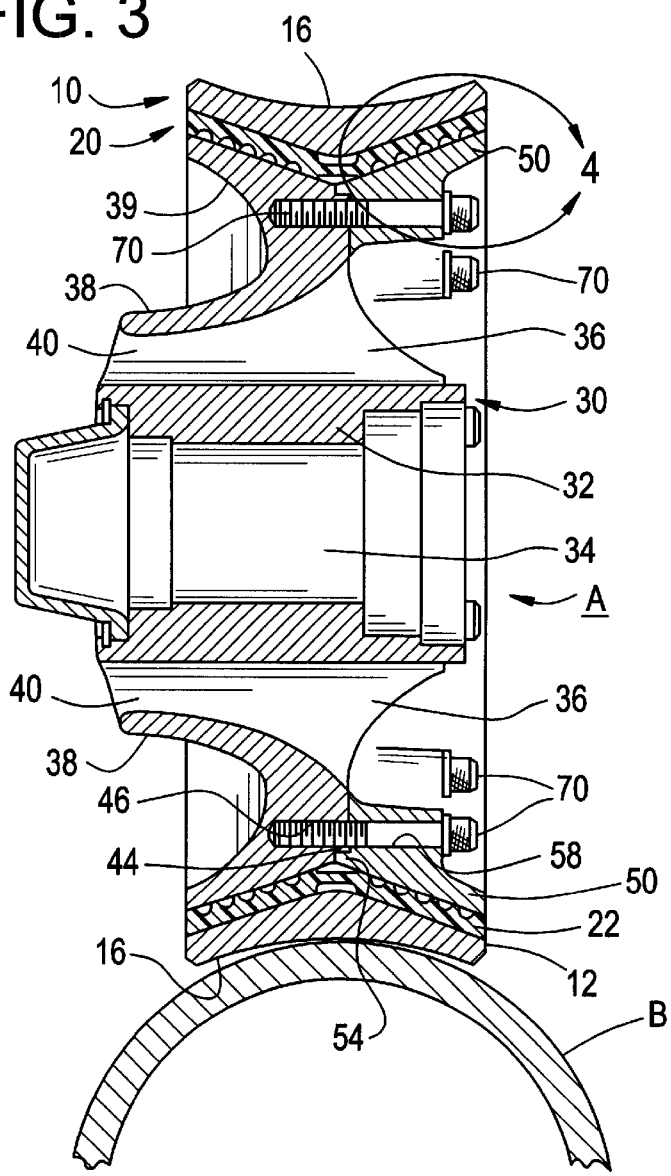
FIG. 3 is a cross-sectional view of the presently preferred form of wheel assembly as in FIG. 1, resting on a tubular rail.
Figure 4:
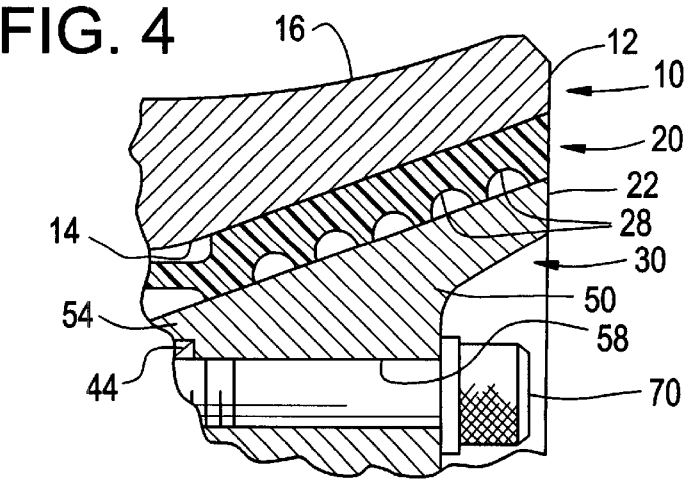
FIG. 4 is an enlarged cross-sectional view of an axial portion of inner and outer tire members and their supporting hub, in accordance with the invention, taken in circle 4—4 of FIG. 3.

Outboard hub member 30 is integrally formed of metal, such as aluminum. It has a central hub part 32 in which a central opening 34 has stepped portions for receiving a conventional axle or bearing support. A plurality of spokes 36 extend radially outward from central hub part 32, in circumferentially spaced positions, supporting an outer peripheral collar 38. The collar 38 has an outwardly axially extending surface 39 which is generally U-shaped in cross-section, as best seen in FIG. 3.

The circumferential spaces between the spokes 36 form a plurality of air passageways 40, which are circumferentially spaced and of which there are preferably between four and eight. On its upper and inward surface the collar 38 has a recess 44, the purpose of which is to establish the correct relative position of the inboard hub member 30.

Each air opening 40 starts with a small dimension on the outboard side of the outboard hub member, near the central hub part 32, but then expands outwardly as it extends toward the inner side of the wheel assembly. There are also bolt holes 46 in the collar 38 to receive the supporting bolts 70.

Inboard hub member 50 is also integrally formed of metal, such as aluminum, and is essentially in the form of a peripheral collar that is mounted upon the collar 38 of the outboard hub member. It has an associated flange 54 on its smaller and inner end to establish a predetermined position of the inboard hub member relative to the inboard hub member. Flange 54 engages the peripheral recess 44 of the outboard hub member. Bolt holes 58 are spaced about the outer hub member 50 for securement to the inboard hub member.

Bolts 70 engage the bolt holes 58 of the inboard hub member 50 and the bolt holes 46 of the outboard hub member 30 to support the inboard hub member in its correct relative position on outboard hub member 30.

Advantages of The Split Hub

The hub of the Wheel Assembly is made of two pieces, The Inboard Hub and The Outboard Hub, which are bolted together in the final assembly. Each piece is made of aluminum. The assembled hub is mounted on a roller coaster axle in exactly the same fashion as presently conventional wheels. The wheel is mounted such that the Inboard hub points toward the vehicle and the Outboard hub points away. The bore in the center of the assembled hub—formed entirely in the outboard hub in the preferred form of the invention—allows for specific commercial bearings, the same bearings as are used by existing wheel systems.

In the space between the bore and the tire, the assembled hub forms a centrifugal fan and heat sink. Because of the particular geometry, as the wheel rotates, air is sucked through the slots in the Outboard Hub and forced out through the Inboard Hub underneath the vehicle. This air motion aids in cooling.

When bolted together, the outer edges of the hub pieces form a concave surface or "V" groove that traps both the Inner Tire and the Outer Tire and holds them in place. The angles and dimensions of the hub pieces are such that as the bolts are tightened during assembly of the wheel, the tires are pre-loaded to a prescribed level. The tires are not bonded to the hub, simply mechanically trapped and ultimately held in place by the balanced forces of the "V" groove pushing out and the force resulting from the "hoop stress" developed in the outer tire pushing in.

Although in the presently preferred form of the invention the tires are not bonded to the hub or to each other, the same assembly of parts may be used with bonding, if so desired.

FIG. 3 shows the wheel assembly A supported from a pipe-shaped or tubular rail B. Such rails are often used in roller coaster installations, because of the relative ease of bending the pipe while maintaining a smooth continuous rail surface. As shown in the drawings, the laterally concave outer surface 16 of the outer tire member 10 engages a relatively narrow part of the surface of the pipe B.

The Outer Tire

The outer tire is made from a fairly hard and rigid material. This is the wear surface. A hard plastic mono-cast material, such as one known commercially under the trademark MC901, may be used. Other optional materials are such as fiber-reinforced Nylon. The hard wear surface of the Outer Tire has the advantageous characteristic that it distributes the load over a comparatively wide area of the softer Inner Tire. In this way, the Inner Tire doesn't experience the cyclical high point loads and associated localized heating with which the current technology tires contend. The harder Outer Tire material will also favorably affect the rolling resistance of the wheel. The concave outer surface serves to more evenly distribute the concentration of forces at the tire/rail interface.

The Inner Tire

The inner tire is the compliant element. The wheel has a spring rate comparable to that of the current technology wheels; however, the load is distributed over a wider area by the hard outer tire. As a result, the Inner Tire can be softer, and, since the inner tire doesn't contact the track surface, it is not subject to the wear problems associated with the current designs. The Inner Tire can be made from a standard polyurethane material. Other elastomers are also under consideration. The materials of the Inner and Outer Tires can be varied at will in order to develop the desired operating parameters.

The Inner Tire 20 has a number of circumferential grooves 28 on its inner surface 26. Since polyurethane and similar materials are effectively incompressible, these grooves allow room for the material to deform under load, thus assisting in the uniform distribution of heat and stress within the tire—but without creating any excessive relative motion of the component parts. This also permits use of a harder material while providing a better spring rate, resulting in lower losses and less heat generation.

Alternatively, the inner tire member may be formed in some other and different manner with protuberances and recesses in at least one of its circumferential surfaces to provide space for radial compression and lateral expansion of the tire material, thereby ensuring resilient support of the outer tire member.

For a typical roller coaster application the outer tire member is made of a material known in the industry as MC901, which has a characteristic intrinsic hardness. The inner tire member is then made of polyurethane rubber, known in the industry as PUR, with a Shore hardness on the A scale of 60 to 90. For the most demanding applications the outer tire member is preferably made of polyethylene terapthalate polyester material, known as PETP, and the inner tire member is again made of PUR.

Assembly and Operation

The wheel assembly is assembled by first deforming the inner tire member 20 so as to insert it inside the outer tire member 10. Then the two hub members 30 and 50 are inserted into the inner tire member from opposite sides, and are bolted together with the bolts 70. As the bolts are tightened, the two separate hub members then form a hub assembly which provides a radially outward supporting force to the inner tire member, and through it to the outer tire member as well. The outer circumferential surface of outboard hub member 30 engages one half of the lateral extent of the inner circumferential surface of the inner tire member 20, while the outer circumferential surface of inboard hub member 50 engages the other half of the lateral extent of the inner circumferential surface of the inner tire member 20.

In operation, outer tire member 10 provides a low friction contact surface against the supporting rail, and resists wear. Inner tire member 20 provides a resilient support.

As best shown in FIG. 1, air enters air intake openings 36 as shown by arrow 90, flows through the opening as shown by arrow 91, and also enters from the inboard side of the wheel assembly as shown by arrows 92. It then exits as shown by arrow 93 in a radially outward direction. The high speed of rotation of the wheel assembly causes the air to flow rapidly, and therefore provides a significant cooling effect.

Because the laterally concave outer surface 16 of the outer tire member 10 engages a relatively narrow part of the surface of the pipe B, there is a concentration of load stress in that narrow area. An advantage of the wheel assembly of the present invention is that the geometrical shapes of the outer and inner tire members, and types of materials used in them, have the effect of spreading the mechanical load in a more effective manner than has been done in the prior art.

Improved Operating Range

The Wheel Assembly of the present invention will have significantly larger Load and Speed operating ranges. This is due to the fact that the assembly design directly addresses the failure modes of the current wheels at the extremes of their capabilities.

Internal Meltdown

The Outer Tire distributes the cyclic point loading that results from the wheel contact with the track over a larger area of the Inner Tire. As a result, less localized hysteretic heating occurs in the Inner Tire. Furthermore, the Inner Tire is significantly thinner than conventional tires, so it can transmit its heat to the hub more readily (polyurethane and similar materials are poor heat conductors). Finally, the heat is eliminated from the hub by the centrifugal fan action when the wheel is in motion and by radiation and convection, from a surface area that is larger than that of typical conventional wheels. The present Wheel Assembly both reduces the cause of local heating and removes the heat more efficiently thus increasing the Load and Speed operating ranges.

Bond Line Failure

Unlike the current technology, in the presently preferred form of the invention the Wheel Assembly tires are not bonded to the hub; thus, this failure mode is eliminated.

Improved Wear Characteristics

Because of the two-tire system of the present Wheel Assembly, an excellent wear surface can be employed without sacrificing the bump smoothing characteristics. Harder materials such as those under consideration for the Outer Tire have been shown in various roller coaster application to significantly improve the life of the tire; however, the cost has always been a rougher ride. The rough ride can be both uncomfortable to the occupants and destructive to the vehicle.

The present Wheel Assembly doesn't need to make this sacrifice to achieve improved wear and therefore reduced operating cost.

Reduced Operating Costs

When the tires do wear out, they are significantly less expensive to replace. The process of replacing tires is simply removing the bolts, separating the hub, removing one or both worn tires, placing the new tire(s) in place, and reassembling the hub. This process can be done in the maintenance bay of the roller coaster with simple hand tools. As described above, this process is difficult, time consuming, and costly for current wheel systems.

Figure 6:
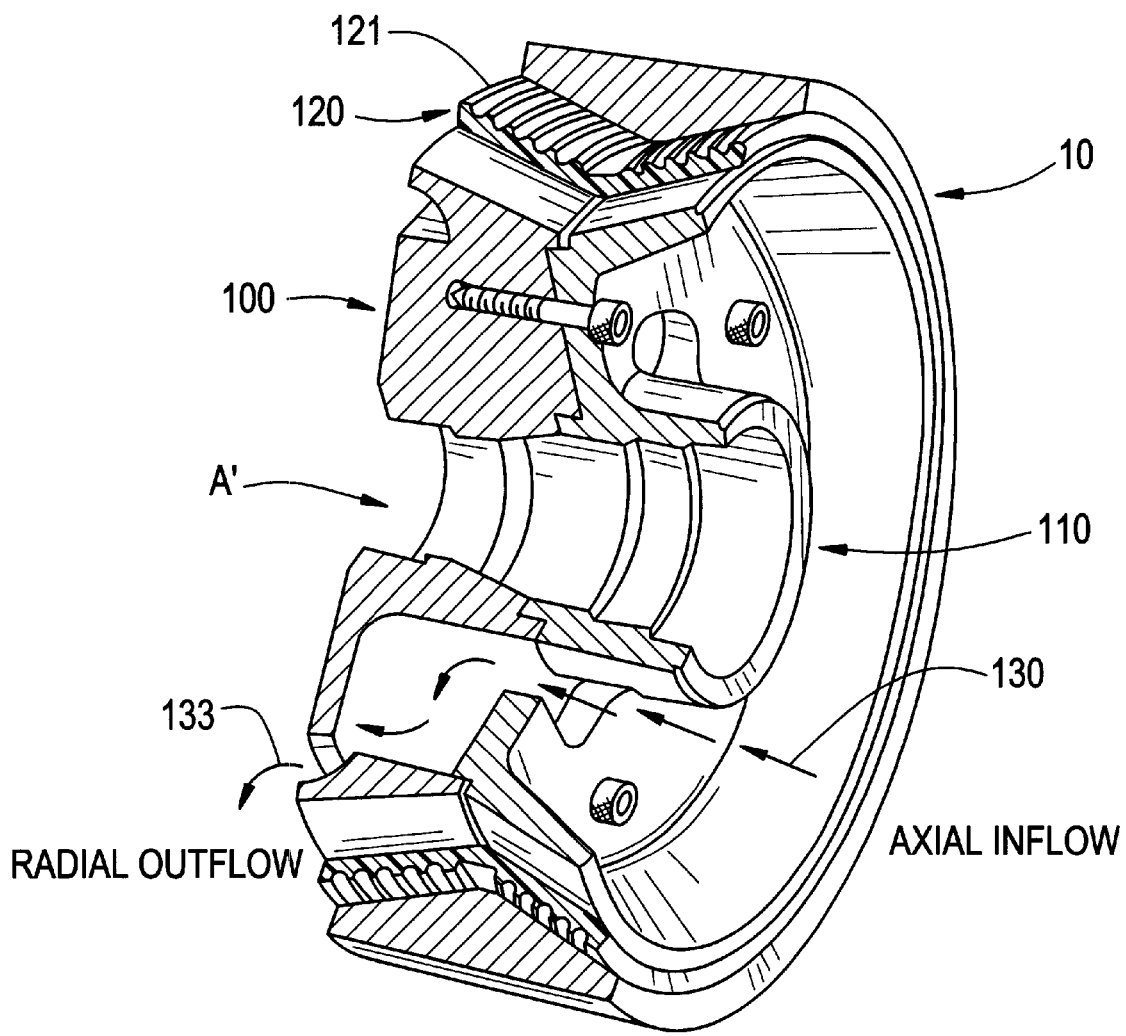
FIG. 6 is a cut-away perspective view of a test prototype form of the wheel assembly in accordance with the invention.
Figure 7:
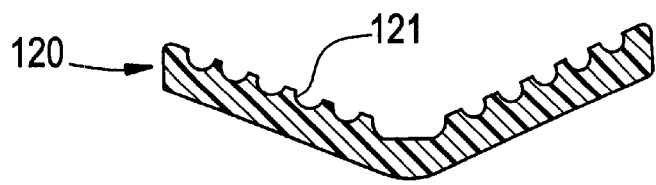
FIG. 7 is a cross-sectional view of the inner tire member utilized in the wheel assembly of FIG. 5.

Test Protype (FIGS. 6, 7)

Figure 2:
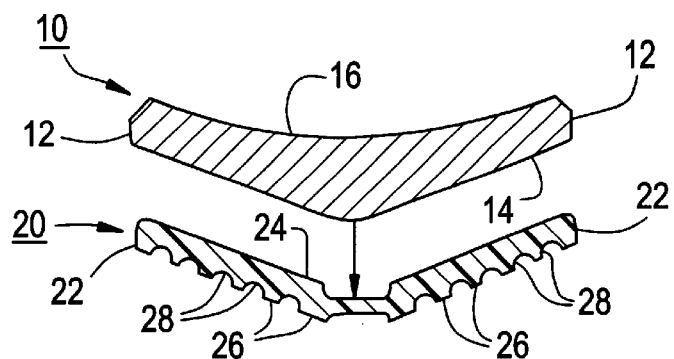
FIG. 2 is a cross-sectional view of the outer and inner tire members of FIG. 1 shown in a spaced or separated relationship.
Figure 5:
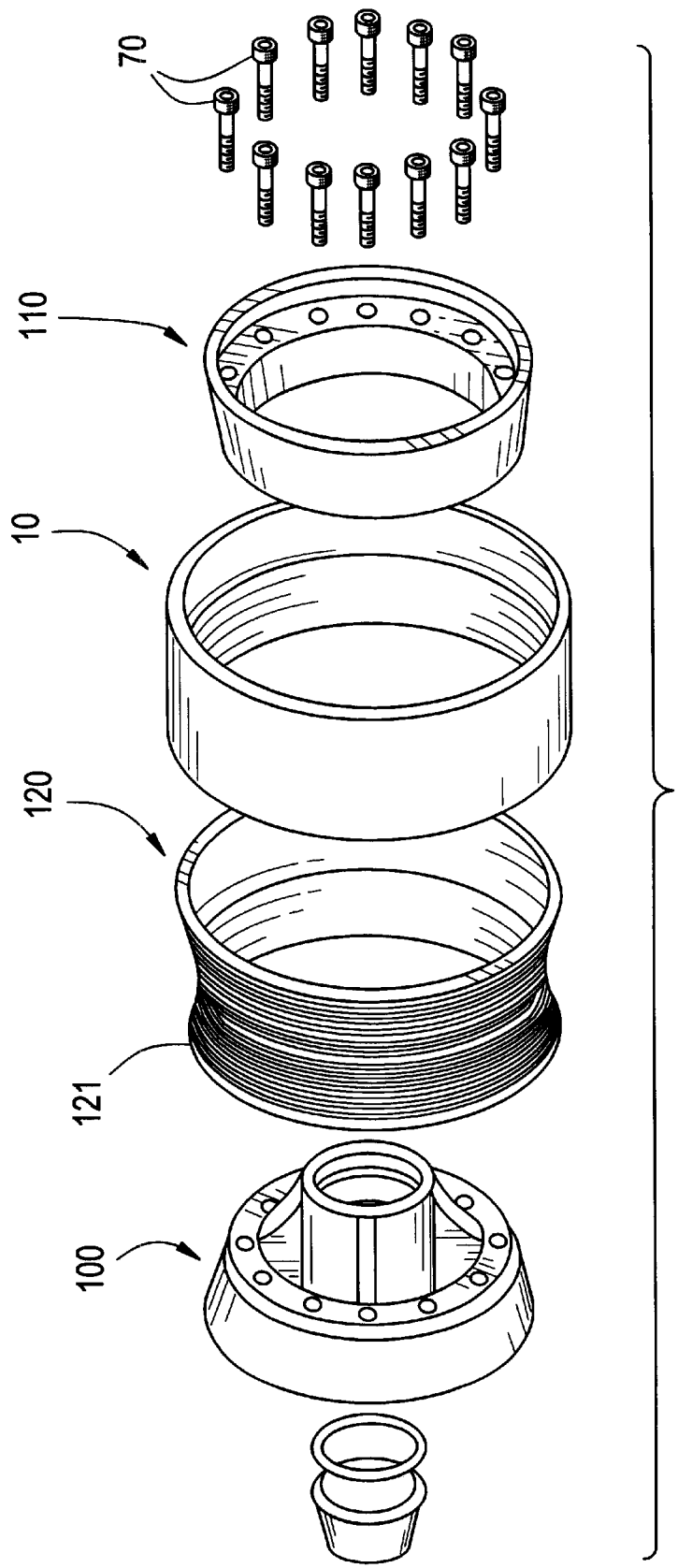
FIG. 5 is an exploded perspective view of a wheel assembly in accordance with the presently preferred form of the invention.

The test prototype wheel assembly A' shown in FIGS. 5 and 6 is very much the same as the preferred embodiment of FIGS. 1–3, but its hub members 100, 110 are generally symmetrical. As shown in FIG. 6, inner tire member 120 has grooves 121 on its outer surface. Another different feature is that the design provided for airflow from the inboard side or underneath the vehicle, toward the outboard side, as indicated by arrows 130 and 133.

The test protype shown in FIGS. 5 and 6 was tested on Dec. 12, 1999 and Jan. 15, 2000 in tests to compare its performance to that of a presently conventional roller coaster wheel assembly. The tests were made in Santa Ana, Calif., at a Uremet facility which specializes in wheel manufacturing and testing. The test results appeared to show a significant improvement in performance of the wheel assembly of the present invention as compared to the presently conventional or standard wheel assembly.

Alternate Forms

Although the wheel assembly of the present invention has been illustrated and described in connection with its application to a roller coaster type vehicle, it will nevertheless be understood that the invention in its entirety, or some portion thereof, may be advantageously utilized in many other applications as well. Among other potential applications, but not limited to such applications, are: luggage wheels, conveyor system rollers, escalator guide wheels, inline roller skate wheels, railroad wheels, skateboard wheels, industrial machine wheels, and aircraft wheels.

In some applications other roller surface profiles may be preferable. Although the invention has been illustrated with an outer tire member that has a laterally concave surface, it will be understood that the same overall combination of elements may be used with an outer tire member that has a laterally flat surface, or even a laterally convex surface.

While many modifications will be apparent to those skilled in the art, the invention has been fully disclosed in its presently preferred form to fully comply with the requirements of the patent laws, and it should therefore be understood that the scope of the invention is to be judged only in accordance with the appended claims.

What we claim is:

1. A generally ring-shaped integrally formed inner tire member for a wheel assembly of a wheeled vehicle, the inner tire member having a circumferential outer surface that is concavely shaped in a lateral direction; being made of resilient material such that it may be deformed in order to position it in interfitting relation inside an outer tire member that has a laterally convex inner circumferential surface; the inner tire member having protuberances and recesses formed in at least one of its circumferential surfaces to permit radial compression and lateral expansion of the tire material.

2. An inner tire member as claimed in claim 1 which is of substantially uniform thickness throughout its lateral width and has a laterally convex inner surface as well as a laterally concave outer surface.

3. A hub assembly for a vehicle wheel comprising first and second hub members each integrally formed of metal:

the first hub member having a central hub part with a central opening for receiving a supporting bearing, a circumferentially extending outer collar, and a plurality of air intake openings in circumferentially spaced positions about the central hub part;

the second hub member being essentially in the form of a circumferential flange mounted upon the collar of the first hub member, having an inner end adapted to engage the collar and an associated peripheral flange thereon to establish a predetermined position of the second hub member relative to the first hub member, the second hub member also having an outer end which is of greater diameter than its inner end;

a plurality of matching bolt holes in the hub members for securing them together;

the outer circumferences of the second hub member and the collar of the first hub member then together forming a concave circumferential surface for receiving a vehicle tire thereon; and each air intake opening being relatively small on one end of the first hub member and expanding to a larger exit opening on the other end of the first hub member and inside the second hub member.

4. A hub assembly as in claim 3 wherein the first hub member is an inboard member and the second hub member is an outboard member, the air intake openings being on the inboard side of the inboard hub member.

5. A tire assembly for a vehicle tire, comprising:

an integrally formed generally ring-shaped outer tire member having a circumferential inner surface;

an integrally formed generally ring-shaped inner tire member having circumferential inner and outer surfaces;

the outer tire member being made of relatively hard and relatively rigid material, and the inner tire member being made of a material that is essentially incompressible but rather easily deformable, such that the inner tire member may be deformed in order to position it inside the outer tire member with the inner surface of the outer tire member in interfitting relation to the outer surface of the inner tire member; and the inner tire member having protuberances and recesses formed in at least one of its circumferential surfaces to provide space for both radial compression and lateral expansion of its material, thereby ensuring resilient support of the outer tire member.

6. A tire assembly as in claim 5 wherein the inner tire member is made of polyurethane.

7. A tire assembly as in claim 5 wherein protuberances and recesses on the inner tire member are formed by circumferential grooves in at least one of its circumferential surfaces.

8. A tire assembly as in claim 5 wherein the outer tire member has a circumferential inner surface that is convexly shaped in a lateral direction, and the inner tire member has a circumferential outer surface that is concavely shaped in a lateral direction.

9. A tire assembly as in claim 5 wherein the outer tire member has a circumferential inner surface that is convexly shaped in a lateral direction, the inner tire member has a circumferential outer surface that is concavely shaped in a lateral direction, the inner tire member is made of polyurethane, and the protuberances and recesses on the inner tire member are formed by circumferential grooves in at least one of its circumferential surfaces.

10. A tire assembly as in claim 5 wherein the inner and outer tire members are not bonded to each other, whereby the support of the tire members depends upon a radially outward force that may be applied by a hub assembly to the inner circumferential surface of the inner tire member.

11. A wheel assembly for a wheeled vehicle comprising:

a generally ring-shaped integrally formed outer tire member having a circumferential inner surface that is convexly shaped in a lateral direction;

a generally ring-shaped integrally formed inner tire member having a circumferential outer surface that is concavely shaped in a lateral direction;

the outer tire member being made of relatively hard and relatively rigid material, and the inner tire member being made of resilient material, such that the inner tire member may be deformed in order to position it inside the outer tire member with the convex inner surface of the outer tire member in interfitting relation to the concave outer surface of the inner tire member, the inner tire member having protuberances and recesses formed in at least one of its circumferential surfaces to provide space for radial compression and lateral expansion of the tire material, thereby ensuring resilient support of the outer tire member;

a hub assembly having an outer circumferential surface;

the inner tire member having an inner circumferential surface that is supported upon the hub assembly in engaging relationship with the outer circumferential surface of the hub assembly; and the hub assembly having securing means for maintaining a radially outward force upon the inner circumferential surface of the inner tire member;

whereby the outer tire member sustains the wear of a running surface upon which the vehicle may be supported, while the inner tire member provides resilient support to the outer tire as well as a smooth ride for the vehicle.

12. A wheel assembly for a wheeled vehicle comprising:

a generally ring-shaped integrally formed outer tire member having a circumferential inner surface that is convexly shaped in a lateral direction;

a generally ring-shaped integrally formed inner tire member having a circumferential outer surface that is concavely shaped in a lateral direction, the inner tire member being of substantially uniform thickness throughout its width, its inner circumferential surface being concave in a lateral direction;

the outer tire member being made of relatively hard and relatively rigid material, and the inner tire member being made of resilient material, such that the inner tire member may be deformed in order to position it inside the outer tire member with the convex inner surface of the outer tire member in interfitting relation to the concave outer surface of the inner tire member, the inner tire member having protuberances and recesses formed in at least one of its circumferential surfaces to provide space for radial compression and lateral expansion of the tire material, thereby ensuring resilient support of the outer tire member;

a hub assembly having an outer circumferential surface;

the inner tire member having an inner circumferential surface that is supported upon the hub assembly in engaging relationship with the outer circumferential surface of the hub assembly; and the hub assembly having securing means for maintaining a radially outward force upon the inner circumferential surface of the inner tire member;

whereby the outer tire member sustains the wear of a running surface upon which the vehicle may be supported, while the inner tire member provides resilient support to the outer tire as well as a smooth ride for the vehicle.

\* \* \* \* \*